Nov. 4, 1947.  P. CRONRATH  2,430,107
TRUNDLE TRUCK
Filed Dec. 22, 1945
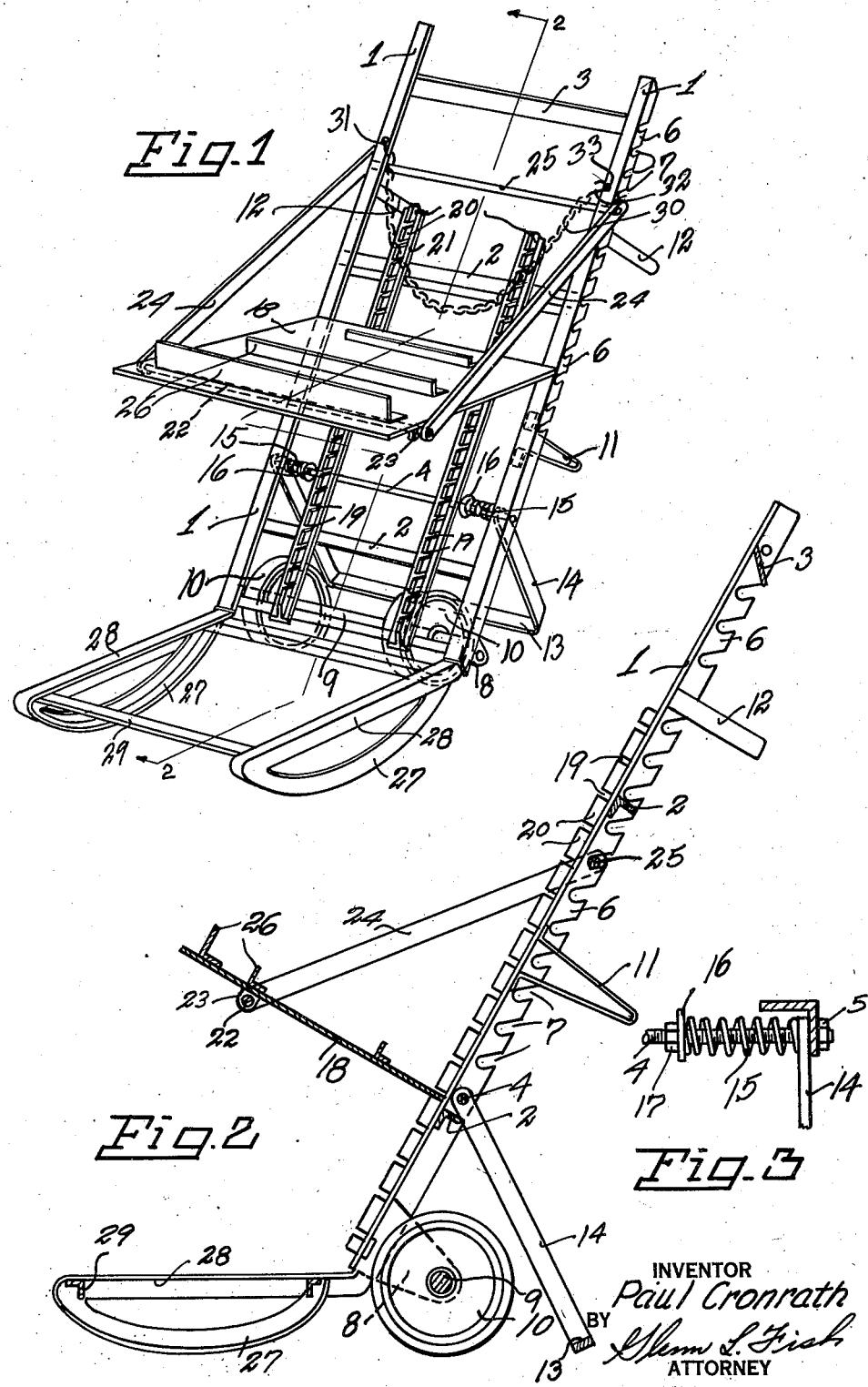
INVENTOR
Paul Cronrath
BY
ATTORNEY Patented Nov. 4, 1947

2,430,107

UNITED STATES PATENT OFFICE 2,430,107

TRUNDLE TRUCK

Paul Cronrath, Spokane, Wash.

Application December 22, 1945, Serial No. 636,935

3 Claims. (Cl. 214—65)

This invention relates to a trundle truck of the type used for moving heavy and bulky objects, such as quarters of beef, from one place to another and it is one object of the invention to provide a truck of such construction that after it has been moved into position under a quarter of beef or the like hanging from an overhead hook the truck may be tilted and a shelf for engaging under and supporting the meat shifted upwardly to remove its weight from the hook and allow the meat to be detached from the hook and moved from one place to another.

Another object of the invention is to provide a truck with a shelf which is so mounted that it may be shifted vertically to adjusted positions and brought to rest in position where it will be disposed close to the lower end of meat suspended from a hook. It will thus be seen that the shelf may be adjusted to accommodate the truck to the length of the meat which is to be detached from a hook and moved.

Another object of the invention is to provide a truck having at its lower end rockers which project forwardly from the truck and upon which the truck is to be tilted in order to raise a quarter of beef under which the shelf of the truck is disposed.

Another object of the invention is to provide a truck which is of light weight but strong and capable of being subjected to rough usage without being broken or otherwise damaged.

The invention is illustrated in the accompanying drawings wherein:

Fig. 1 is a perspective view of the improved truck.

Fig. 2 is a sectional view taken vertically through the truck along the line 2—2 of Figure 1.

Fig. 3 is a fragmentary sectional view taken transversely through a side portion of the truck.

This truck has a frame provided with side bars 1 between which extend cross bars 2 formed of angle metal and an upper cross bar 3 formed from a flat strip of metal. There has also been provided a rod 4 having threaded end portions carrying securing nuts 5. The side bars are formed of angle metal and these side bars have their flanges 6 extending downwardly along their outer side edges and formed with longitudinally spaced slots 7 which extend at the angle shown in Figure 2 and are open at their rear ends. Brackets 8 extend rearwardly from lower ends of the side bars and carry an axle 9 upon which wheels 10 are mounted. Short U-shaped legs 11 extend from the side bars in opposed relation to each other and above these legs are other legs 12. These legs 11 and 12 will serve very effectively to support the truck when swung rearwardly and downwardly to a reclining position.

A prop 13 is provided in spaced relation to the lower end of the frame and this prop, which is formed from a strip of stiff metal, is of U-shaped formation and has its arms 14 formed with openings to receive the rod 4 and pivotally mount the prop for swinging movement into and out of position for use. Helical springs 15 fit about the rod 4 and have their outer end bearing against inner faces of the flanges 6 of side bars 1 and their inner ends abutting washers 16 which fit about the rod and are engaged by nuts 17 threaded upon the rod. By adjusting the nuts along the rod tension of the springs may be adjusted and the arms 14 of the prop 13 subjected to desired binding engagement with the flanges of the side bars. Therefore the prop may be swung to a folded position against the side bars of the frame or to an extended position it will support the truck in the position shown in Figures 1 and 2.

A shelf 18 extends forwardly from the frame 1 for supporting a quarter of beef to be transported on the truck. This shelf is formed of sheet metal and its rear edge removably engaged in selected slots 19 formed in the webs or forwardly projecting flanges 20 of T-bars 21 carried by the cross bars 2 and extending longitudinally of the frame in transverse spaced relation to each other. A rod 22 extends under the shelf transversely thereof near its front and through eyes 23 and ends of this rod are engaged with front ends of supporting bars 24 which extend rearwardly from the rod at opposite sides of the shelf and have their rear ends engaged with a rod 25 disposed back of the frame and removably engaged in selected ones of the slots 7 formed in flanges of the side bars 1. The shelf will thus be firmly supported in a horizontal position in front of the frame and may be easily shifted vertically to adjusted positions. Strips or bars 26 formed of angle metal are mounted across the shelf or platform 18 so that when a quarter of beef is brought to rest upon the shelf it will have its lower portion resting upon the upstanding flanges of the strips and be prevented from slipping forwardly off of the shelf. The forward one of the strips 26 extends the full width of the shelf and is formed from a larger strip of angle metal so that it constitutes a very effective barrier for overlapping the beef and limiting its forward movement upon the shelf.

When a quarter of beef or the like is to be removed from an overhead hook in an icebox or cold storage room and moved the truck is rolled along the floor into place and its shelf disposed under the beef. The shelf should be close to the lower end of the beef and if necessary the shelf will be shifted vertically to dispose it in its proper position. The truck must then be rocked forwardly and upwardly in order to bring the shelf into lifting engagement with the beef and raise the beef to such an extent that its weight will be removed from the hook and allow the beef to be easily detached from the hook. In order that the truck may be rocked forwardly and upwardly there have been provided rockers 27 carried by arms 28 which project forwardly from lower ends of the side bars 1. The arms 28 are formed by bending forwardly portions of the angle metal from which the side bars are formed and forward portions of the arms are then bent downwardly and rearwardly to form the rockers which have their rear ends welded or otherwise firmly secured to the arms. Cross bars 29 are mounted between end portions of the arms and brace them against transverse bending. After the truck has been rocked forwardly and upwardly upon the rockers 27 and the meat detached from the overhead hook it will settle upon the shelf where it is secured by a chain 30 having one end connected with a shackle 31 of one side bar 1 and provided with a hook 32 at its other end for engaging through an eye 33 carried by the other side bar. The truck will then be tilted rearwardly onto the wheels 10 and pushed along the floor. If it is desired to allow the truck to remain in an upright position with the meat resting upon it the prop 13 is swung downwardly from a folded position against the under or rear face of the frame and since the bridge of the prop will rest upon the floor back of the wheels the truck will be supported and prevented from moving out of the upright position shown in Figure 2. When the truck is not in use the rear end of the shelf may be moved out of engagement with the bars 21 and disposed flat against the frame of the truck and the truck then tilted rearwardly to a reclining position in which it will rest upon the supports 11 and 12. The arms 28 not only serve as carriers for the rockers 27 but may also serve as supports for the shelf when the shelf is in a fully lowered position. When it is desired to use the truck without a shelf the rod 25 may be disengaged from notches of the side bars 1 and the shelf then moved upwardly out of engagement with the frame. A load carried by the truck will then rest upon the arms 28.

Having thus described the invention, what is claimed is:

1. A truck comprising a frame having side bars and cross bars, wheels mounted back of the lower end of said frame, a shelf in front of said frame, bars extending longitudinally of said frame and formed with longitudinally spaced seats for receiving the rear edge portion of the shelf and holding the shelf in vertically adjusted positions, the side bars having seats spaced from each other along the rear edges of the side bars, and a yoke having a cross bar engageable in selected seats of the side bars and bars extending forwardly from the cross bar and pivoted to opposite side edge portions of the shelf.

2. A truck comprising a frame having side bars and cross bars, wheels mounted back of the lower end of said frame, a shelf in front of said frame, bars extending longitudinally of said frame and formed with longitudinally spaced seats for receiving the rear edge portion of the shelf and holding the shelf in vertically adjusted positions, the side bars of said frame being formed of angle metal having rearwardly extending flanges formed with slots leading from their rear edges, and a support for the yoke consisting of a rod engageable in selected ones of the slots in the side bars of the frame, and bars mounted upon ends of the rod and extending forwardly with their front ends pivotally mounted at opposite sides of the front end portion of the shaft.

3. A truck comprising a frame having side bars and cross bars, wheels mounted back of the lower end of said frame, a shelf in front of said frame, bars extending longitudinally of said frame and formed with longitudinally spaced seats for receiving the rear edge portion of the shelf and holding the shelf in vertically adjusted positions, the side bars having vertically spaced slots, a rod mounted transversely of the shelf under the front end portion thereof with its ends projecting from sides of the shelf, bars pivoted at their front ends to ends of the rod, and a rod mounted between rear ends of the bars and engaged in selected slots of the side bars.

PAUL CRONRATH.

REFERENCES CITED

The following references are of record in the file of this patent:

UNITED STATES PATENTS

| Number | Name | Date |
| --- | --- | --- |
| 474,653 | Deffler | May 10, 1892 |
| 779,124 | Haffey | Jan. 3, 1905 |
| 795,147 | Magoffin | July 18, 1905 |
| 929,291 | Dawkins | July 27, 1909 |
| 977,056 | Verblanck | Nov. 29, 1910 |
| 1,015,393 | Murphy | Jan. 23, 1912 |
| 1,578,602 | Heath | Mar. 30, 1926 |
| 1,727,523 | Schwenk | Sept. 10, 1920 |
| 1,866,887 | Gleason et al. | July 12, 1932 |
| 2,056,078 | Slater | Sept. 29, 1936 |
| 2,084,310 | Breuer | June 22, 1937 |
| 2,313,868 | Garlinghouse | Mar. 16, 1943 |

FOREIGN PATENTS

| Number | Country | Date |
| --- | --- | --- |
| 340,514 | France | May 14, 1904 |
| 351,771 | Great Britain | July 2, 1931 |